US009082017B2

(12) United States Patent
Nammoto et al.

(10) Patent No.: US 9,082,017 B2
(45) Date of Patent: Jul. 14, 2015

(54) ROBOT APPARATUS AND POSITION AND ORIENTATION DETECTING METHOD

(71) Applicant: Seiko Epson Corporation, Tokyo (JP)

(72) Inventors: Takashi Nammoto, Sendai (JP); Koichi Hashimoto, Sendai (JP); Chuantao Zang, Sendai (JP)

(73) Assignee: Seiko Epson Corporation (JP)

( * ) Notice: Subject to any disclaimer, the term of this patent is extended or adjusted under 35 U.S.C. 154(b) by 122 days.

(21) Appl. No.: 13/743,655

(22) Filed: Jan. 17, 2013

(65) Prior Publication Data
US 2013/0182903 A1 Jul. 18, 2013

(30) Foreign Application Priority Data

Jan. 18, 2012 (JP) ................................. 2012-008103

(51) Int. Cl.
G06T 7/00 (2006.01)
G06T 17/00 (2006.01)
G06T 19/00 (2011.01)
G06K 9/00 (2006.01)

(52) U.S. Cl.
CPC .......... *G06K 9/00664* (2013.01); *G06T 7/0044* (2013.01); *G06T 2207/10004* (2013.01); *G06T 2207/30244* (2013.01); *Y10S 901/47* (2013.01)

(58) Field of Classification Search
CPC .................. G06T 7/0046; G06T 2207/10028; G06T 17/00; G06T 19/003
USPC ................................. 382/103, 106, 154, 285
See application file for complete search history.

(56) References Cited

U.S. PATENT DOCUMENTS

| 7,321,370 | B2 | 1/2008 | Ishiyama |
| 7,593,019 | B2 | 9/2009 | Ishiyama |
| 7,627,178 | B2 | 12/2009 | Suzuki et al. |
| 7,710,431 | B2 | 5/2010 | Ishiyama |
| 7,932,913 | B2 | 4/2011 | Ishiyama |
| 2009/0096790 | A1* | 4/2009 | Wiedemann et al. .......... 345/427 |
| 2010/0086218 | A1* | 4/2010 | Tateno ........................... 382/203 |

FOREIGN PATENT DOCUMENTS

JP 2002-157595 5/2002
JP 4492036 4/2010

OTHER PUBLICATIONS

Chuantao Zang, et al. "3D object tracking using computer graphics and edge", Graduate School of Information Sciences, Tohoku University, Japan, Dec. 7-11, 2011 (pp. 2407-2408).
Chuantao Zang & Koichi Hashimoto, "A flexible visual inspection system combining pose estimation and visual servo approaches", Graduate School of Information Sciences, Tohoku University, Japan, May 14-18, 2012 (pp. 1304-1309).
Chuantao Zang & Koichi Hashimoto, "Camera Localization by CAD Model Matching", Graduate School of Information Sciences, Tohoku University, Japan, 2011 (pp. 30-35).

(Continued)

*Primary Examiner* — Amir Alavi
*Assistant Examiner* — Kenny Cese
(74) *Attorney, Agent, or Firm* — Harness, Dickey & Pierce, P.L.C.

(57) ABSTRACT

A robot apparatus includes a reference-model storing unit configured to store a reference model of an object, a feature-value-table storing unit configured to store a feature value table that associates position data and orientation data of the reference model and a feature value, a photographed-image acquiring unit configured to capture a photographed image of the object, a detecting unit configured to calculate a photographed image feature value from the photographed image, and a driving control unit configured to control a robot main body on the basis of the position data and the orientation data to change the position and the orientation of a gripping unit.

14 Claims, 10 Drawing Sheets

(56) References Cited

OTHER PUBLICATIONS

Chuantao Zang, "Camera Positioning with CAD Model Matching", Graduate School of Information Sciences, Tohoku University, Mar. 25, 2012 (Part 1; 105 pages).

Chuantao Zang, "Camera Positioning with CAD Model Matching", Graduate School of Information Sciences, Tohoku University, Mar. 25, 2012 (Part 2; 105 pages).

* cited by examiner

ROBOT APPARATUS AND POSITION AND ORIENTATION DETECTING METHOD

BACKGROUND

1. Technical Field

The present invention relates to a robot apparatus and a position and orientation detecting method.

2. Related Art

There is known an object detecting apparatus that collates a target object image obtained by an image pickup apparatus picking up an image of a target object and a three-dimensional shape model registered in advance to thereby detect the position and the orientation of the target object (see, for example, JP-A-2002-157595).

However, the object detecting apparatus in the past to which the three-dimensional shape model is applied calculates the position and the orientation of the target object using six variables indicating translation and rotation in a three-dimensional Cartesian coordinate system in order to estimate the position and the orientation of the target object. Therefore, the object detecting apparatus consumes enormous time to assume accurate position and orientation of the target object.

SUMMARY

An advantage of some aspects of the invention is to provide a robot apparatus and a position and orientation detecting method for estimating the position and the orientation of an object in a shorter time than in the past when a three-dimensional model is applied to the estimation.

[1] An aspect of the invention is directed to a robot apparatus including: a robot main body movably including a hand; a reference-model storing unit configured to store a reference model obtained by converting an object into a three-dimensional model; a feature-value-table storing unit configured to store a feature value table that associates position data and orientation data of the reference model, which are obtained every time the position and the orientation of the reference model in a three-dimensional space are changed at an interval set in advance, and a reference model image feature value, which is a feature value of a two-dimensional reference model image; a photographed-image acquiring unit configured to capture a photographed image of the object; a detecting unit configured to calculate a photographed image feature value, which is a feature value of the photographed image captured by the photographed-image acquiring unit, detect, from the feature value table stored in the feature-value-table storing unit, a reference model image feature value coinciding with the photographed image feature value and extract a plurality of sets of position data and orientation data associated with the reference model image feature value, set, according to the plurality of sets of position data and orientation data, a position and a orientation in the three-dimensional space of the reference model stored in the reference-model storing unit and acquire two-dimensional images for the plurality of sets, and choose position data and orientation data corresponding to a two-dimensional image having a highest correlation between the photographed image and each of the two-dimensional images for the plurality of sets; and a driving control unit configured to control the robot main body on the basis of the position data and the orientation data detected by the detecting unit to change the position and the orientation of the hand.

The robot main body is, for example, a vertical multi-joint robot.

As explained above, the robot apparatus according to the aspect generates and retains a feature value table corresponding to an object in advance. Consequently, the robot apparatus according to the aspect has feature values associated with various positions and orientations of the object in advance. Therefore, the robot apparatus can calculate, without executing heavy-load calculation processing in which six variables including $[x, y, z, \theta_x, \theta_y, \theta_z]^T$ are used, the position and the orientation of the object by calculating a feature value from a photographed image of the object.

[2] The robot apparatus described in [1] may further include a detailed detection unit configured to capture the position data and the orientation data detected by the detecting unit, set, according to the position data and the orientation data, a position and a orientation in the three-dimensional space of the reference model stored in the reference-model storing unit and acquire a two-dimensional image, and calculate a two-dimensional image having a highest correlation between the photographed image and the two-dimensional image according to a nonlinear minimization method and detect position and orientation orientation corresponding to the two-dimensional image. The driving control unit may control the robot main body on the basis of the position data and the orientation data detected by the detailed detection unit to change the position and the orientation of the hand.

The detailed detection unit applies, for example, a steepest descent method or a Levenberg-Marquardt or the like algorithm as the nonlinear minimization method.

Since the robot apparatus further includes the detailed detection unit as explained above, the robot apparatus can accurately detect the position and the orientation of the object and control the robot main body.

[3] In the robot apparatus described in [2], the nonlinear minimization method may be the steepest descent method.

[4] In the robot apparatus described in [2], the nonlinear minimization method may be the Levenberg-Marquardt algorithm.

[5] In the robot apparatus described in any one of [1] to [4], the reference model may be three-dimensional computer graphics.

When the reference model is realized by the three-dimensional computer graphics, for example, a computer apparatus can easily generate the reference model on the basis of a design drawing of an object or a reference, a computer aided design (CAD) drawing, or the like.

[6] In the robot apparatus described in any one of [1] to [5], the reference model image feature value may be a coordinate value indicating a center of gravity position of the reference model image, and the photographed image feature value may be a coordinate value indicating a center of gravity position of the photographed image.

In other words, the reference model image feature value is key data for extracting position data and orientation data from the feature value table and is a feature value of a relatively low dimension.

[7] In the robot apparatus described in any one of [1] to [5], the reference model image feature value may be an image moment of the reference model image, and the photographed image feature value may be an image moment of the photographed image.

Since the image moment is the reference model image feature value as explained above, it is possible to obtain an accurate feature value according to the shape of a reference model.

[8] Another aspect of the invention is directed to a robot apparatus including: a robot main body movably including hands of two systems; a conveying unit configured to support the robot main body to be capable of moving; an imaging unit attached to one hand of the hands of the two systems and configured to photograph an object to generate a photographed image; a reference-model storing unit configured to store a reference model obtained by converting the object into a three-dimensional model; a feature-value-table storing unit configured to store a feature value table that associates position data and orientation data of the reference model, which are obtained every time the position and the orientation of the reference model in a three-dimensional space are changed at an interval set in advance, and a reference model image feature value, which is a feature value of a two-dimensional reference model image; a photographed-image acquiring unit configured to capture the photographed image generated by the photographing unit; a detecting unit configured to calculate a photographed image feature value, which is a feature value of the photographed image captured by the photographed-image acquiring unit, detect, from the feature value table stored in the feature-value-table storing unit, a reference model image feature value coinciding with the photographed image feature value and extract a plurality of sets of position data and orientation data associated with the reference model image feature value, set, according to the plurality of sets of position data and orientation data, a position and a orientation in the three-dimensional space of the reference model stored in the reference-model storing unit and acquire two-dimensional images for the plurality of sets, and detect position data and orientation data corresponding to a two-dimensional image having a highest correlation between the photographed image and each of the two-dimensional images for the plurality of sets; and a driving control unit configured to control the robot main body on the basis of the position data and the orientation data detected by the detecting unit to change the position and the orientation of the other hand of the hands of the two systems.

The robot main body is, for example, a vertical multi-joint robot (a double arm robot) including hands of two systems.

As explained above, the robot apparatus according to the aspect generates and retains a feature value table corresponding to an object in advance. Consequently, the robot apparatus according to the aspect has feature values associated with various positions and orientations of the object in advance. Therefore, the robot apparatus can calculate, without executing heavy-load calculation processing in which six variables including $[x, y, z, \theta_x, \theta_y, \theta_z]^T$ are used, the position and orientation of the object by calculating a feature value from a photographed image of the object.

[9] Still another aspect of the invention is directed to a position and orientation detecting method including: a photographed-image acquiring unit capturing a photographed image of an object; a detecting unit calculating a photographed image feature value, which is a feature value of the photographed image captured from the photographed-image acquiring unit; the detecting unit detecting the reference model image feature value which coincides with the photographed image feature value, from a feature value table stored in a feature-value-table storing unit having stored therein the feature value table that associates position data and orientation data of the reference model, which are obtained every time a position and a orientation in a three-dimensional space of a reference model obtained by converting the object into a three-dimensional model are changed at an interval set in advance, and a reference model image feature value, which is a feature value of a two-dimensional reference model image, and extracting a plurality of sets of position data and orientation data associated with the reference model image feature value; the detecting unit setting, according to the plurality of sets of position data and orientation data, a position and a orientation in the three-dimensional space of the reference model stored in the reference-model storing unit having stored therein the reference model and acquiring two-dimensional images for the plurality of sets; and the detecting unit detecting position data and orientation data corresponding to a two-dimensional image having a highest correlation between the photographed image and each of the two-dimensional images for the plurality of sets.

As explained above, in the position and orientation detecting method according to the aspect, a feature value table corresponding to an object is generated and retained in advance. Consequently, in the position and orientation detecting method according to the aspect, feature values associated with various positions and orientations of the object are stored in advance. Therefore, it is possible to calculate, without executing heavy-load calculation processing in which six variables including $[x, y, z, \theta_x, \theta_y, \theta_z]^T$ are used, the position and the orientation of the object by calculating a feature value from a photographed image of the object.

Therefore, according to the aspects of the invention, it is possible to estimate the position and the orientation of an object in a shorter time than in the past when a three-dimensional model is applied to the estimation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
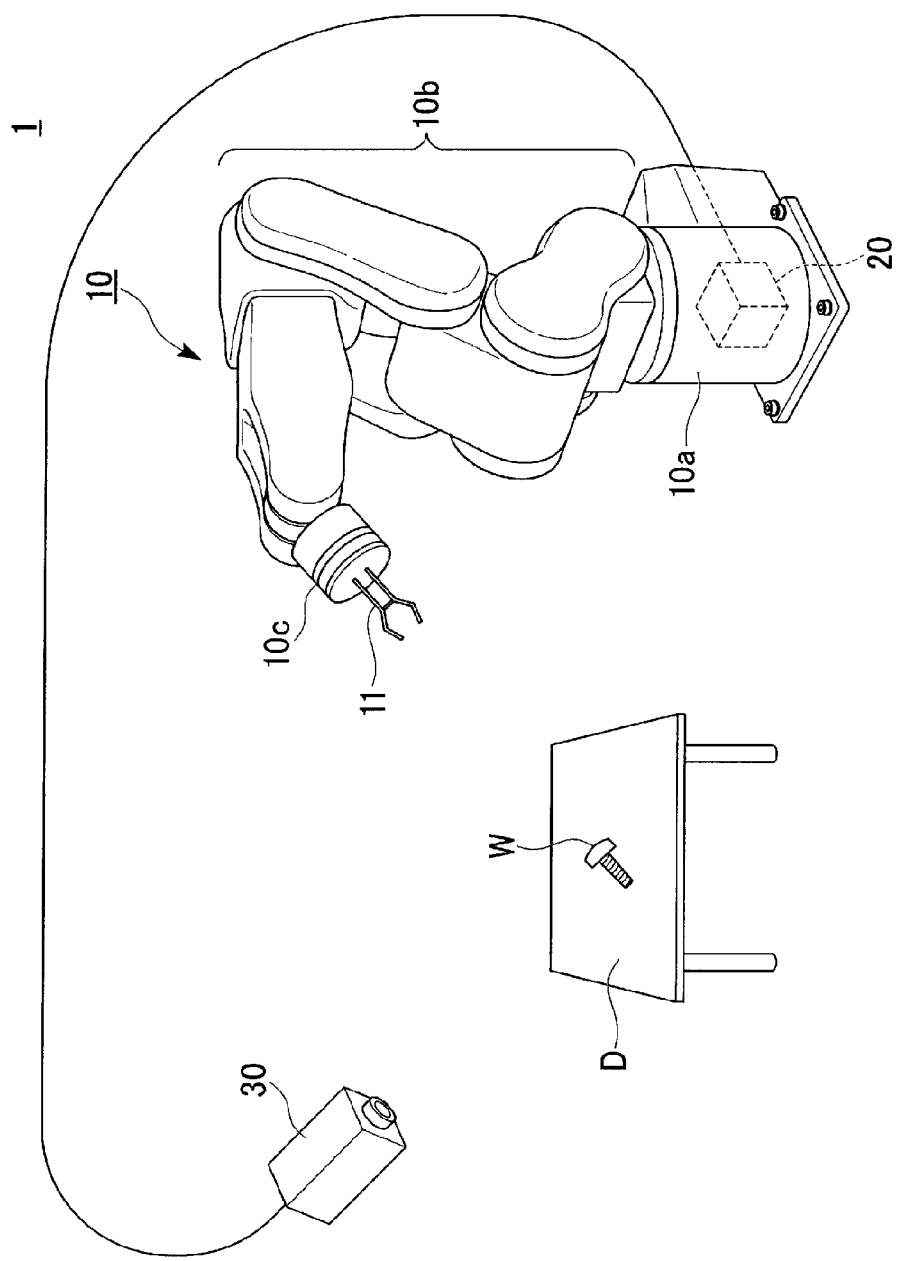
FIG. 1 is a schematic external view showing a state in which a robot system, to which a robot apparatus and a position and orientation detecting device according to a first embodiment of the invention are applied, performs work.

Embodiments of the invention are explained in detail below with reference to the drawings.
First Embodiment A robot system according to a first embodiment of the invention is a system that obtains the photographed image of the target object, and, on the basis of the photographed image, controls the position and the orientation of a gripping unit attached to a robot main body to move the gripping unit toward a target object.
Configuration of the Robot System FIG. 1 is a schematic external view showing a state in which a robot system, to which a robot apparatus and a position and orientation detecting device according to the first embodiment of the invention are applied, performs work.

In the figure, the robot system 1 includes a robot main body 10, a gripping unit 11, a robot control device 20 housed on the inside of the robot main body 10, and a photographing device 30. The robot main body 10 and the robot control device 20 are included in a robot apparatus.

The robot main body 10 includes the gripping unit movably. The gripping unit 11 includes a claw unit capable of gripping or holding an object. In FIG. 1, the gripping unit 11 is schematically shown to show a function thereof.

The robot main body 10 specifically includes a supporting table 10a fixed with respect to the ground, an arm unit 10b coupled to the supporting table 10a to be capable of turning and capable of bending, and a hand unit (a hand) 10c attached to the arm unit 10b to be capable of turning and capable of swinging. The robot main body 10 is, for example, a six-axis vertical multi-joint robot. The robot main body 10 has six degrees of freedom according to coordinated actions of the supporting table 10a, the arm unit 10b, and the hand unit 10c.

The robot main body 10 freely changes, according to driving control by the robot control device 20, the position and the orientation of the gripping unit 11 in a three-dimensional space and causes the claw unit of the gripping unit 11 to open and close.

The robot main body 10 is not limited to a robot main body having a degree of freedom of six axes and may be, for example, a robot main body having a degree of freedom of seven axes. The supporting table 10a may be set in a place fixed with respect to the ground such as a wall or a ceiling.

As shown in FIG. 1, a desk D on which a target object (an object) W is placed is set in a movable range of the gripping unit 11 moved by the action of the robot main body 10. The target object W is an object to be gripped or held by the gripping unit 11. In this embodiment, the target object W is a "screw".

The photographing device 30 photographs the target object W placed on the desk D, acquires a photographed image, which is a still image or a moving image, and supplies the photographed image to the robot control device 20. The photographing device 30 is realized by, for example, a digital camera device or a digital video camera device.

The robot control device 20 captures the photographed image of the target object W supplied from the photographing device 30 and detects the position and the orientation of the target object W on the basis of the photographed image. The robot control device 20 controls the actions of movable units of the robot main body 10 on the basis of the detected position and orientation to move the gripping unit 11 toward the target object W.

In FIG. 1, the robot control device 20 is housed in the supporting table 10a of the robot main body 10. The robot control device 20 may be set to be separated from the robot main body 10. In this case, the robot control device 20 and the robot main body 10 are connected via, for example, a communication line (a network, a serial communication line, etc.).
Configuration of the Robot Control Device 20

Figure 2:
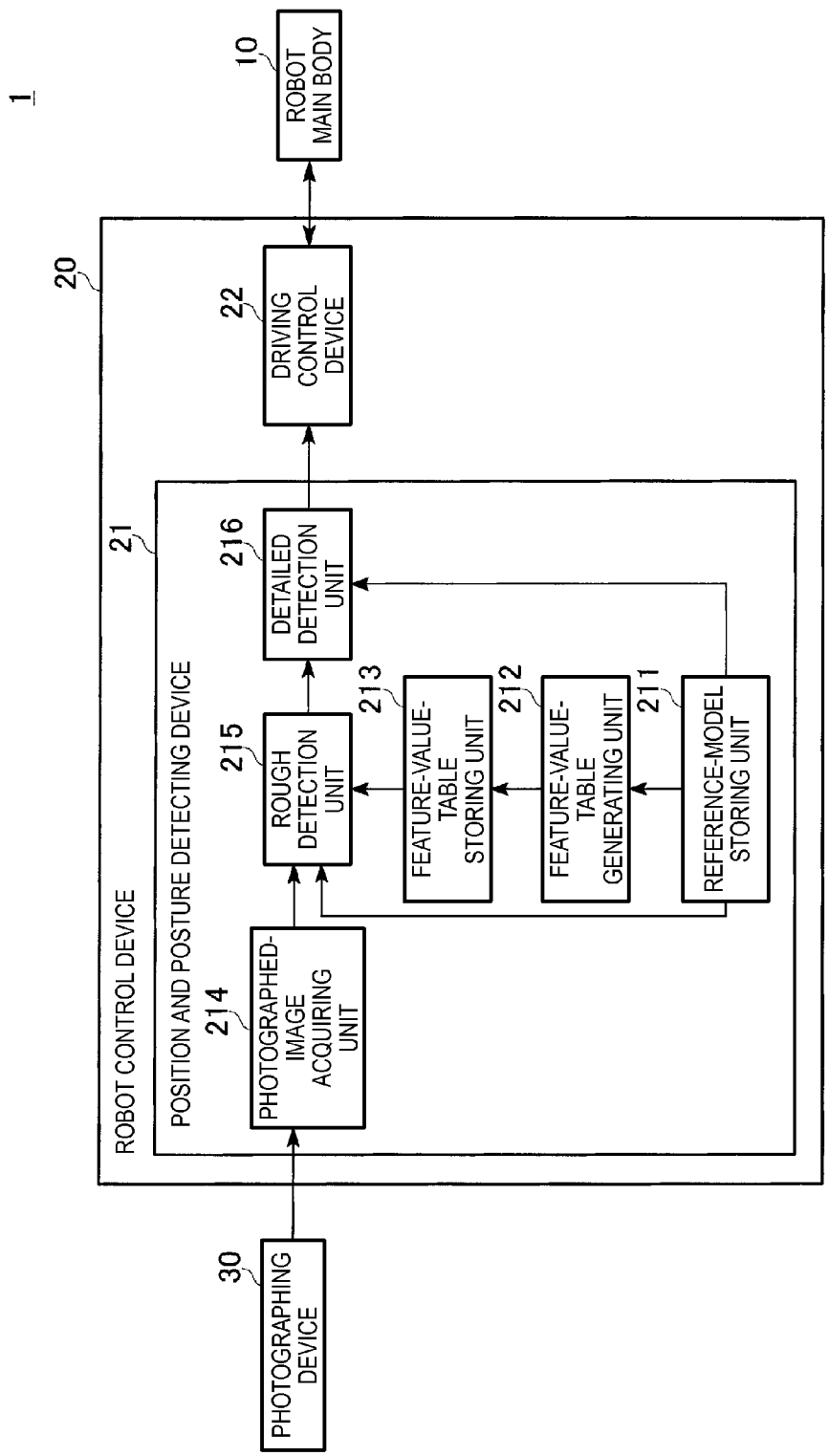
FIG. 2 is a schematic block diagram of the robot system in the embodiment.

FIG. 2 is a schematic block diagram of the robot system 1. The figure mainly shows a functional configuration of the robot control device 20.

As shown in the figure, the robot control device 20 includes a position and orientation detecting device 21 and a driving control device 22.

The position and orientation detecting device 21 stores, in advance, three-dimensional model data (a reference model) obtained by converting the target object W or a reference of the target object W into a three-dimensional model. The reference is an object having an ideal shape, pattern, or color of the target object W or a combination of the shape, the pattern, and the color. The reference model is, for example, three-dimensional computer graphics (CG). The three-dimensional CG is represented as, for example, a set of polygon data. When the reference model is realized by the three-dimensional CG, for example, a computer apparatus or the like can easily generate the reference model on the basis of a design drawing of the target object W or the reference, a computer aided design (CAD) drawing, or the like.

The position and orientation detecting device 21 is set in a learning mode or a measurement mode to operate. The learning mode is a mode for calculating a feature value (a reference model image feature value) on the basis of a two-dimensional reference model image obtained every time the position and the orientation of the reference model are changed stepwise and storing a feature value table that associates the feature value with position data and orientation data of the reference model. The measurement mode is a mode for detecting the position and the orientation of the target object W on the basis of a photographed image of the target object W and the feature value of the reference model image. As detection processing for the position and the orientation of the target object W in the measurement mode, there are rough detection processing and detailed detection processing. Details of the rough detection processing and the detailed detection processing are explained below.

The position and orientation detecting device 21 includes, as functional components thereof, a reference-model storing unit 211, a feature-value-table generating unit 212, a feature-value-table storing unit 213, a photographed-image acquiring unit 214, a rough detection unit (a detecting unit) 215, and a detailed detection unit 216.

The reference-model storing unit 211 stores, in advance, a reference model obtained by converting the target object W into a three-dimensional model. The reference-model storing unit 211 is realized by, for example, a semiconductor storage device.

The feature-value-table generating unit 212 includes a not-shown storing unit. The feature-value-table generating unit 212 expands, on a memory space of the storing unit, a virtual three-dimensional space (a virtual space) in which a reference model of the target object W is present. The feature-valuetable generating unit 212 sets, on the virtual space, a virtual photographing device (a virtual camera) for photographing the reference model. "The virtual camera photographs the reference model" means that the virtual camera takes a picture of the reference model in an angle of view (a frame) as a subject and acquires a two-dimensional image. The two-dimensional image is referred to as reference model image.

The feature-value-table generating unit 212 changes the position and the orientation of the reference model stepwise in the virtual space at an interval set in advance and causes the virtual camera to repeatedly acquire a reference model image, which is a photographed image of the reference model. In other words, the feature-value-table generating unit 212 acquires a plurality of reference model images corresponding to various positions and orientations of the reference model in the virtual space. The feature-value-table generating unit 212 calculates a feature value of the reference model image (a reference model image feature value) and generates a feature value table in which a record that associates the feature value with position data and orientation data of the reference model corresponding to the reference model image is added for each reference model image. The feature-value-table generating unit 212 supplies the generated feature value table to the feature-value-table storing unit 213.

A interval of change for the feature-value-table generating unit 212 changing the position and the orientation of the reference model stepwise affects accuracy of detection of the position and the orientation of the target object W by the rough detection unit 215 and the detailed detection unit 216. When the interval of change is reduced (the interval is reduced), the detection accuracy by the rough detection unit 215 and the detailed detection unit 216 increases. On the other hand, the number of records of the feature value table increases. In this embodiment, the position and orientation detecting device 21 has a configuration for executing rough detection processing in the rough detection unit 215 and executing detailed detection processing in the detailed detection unit 216 at a post stage of the rough detection processing. Therefore, the interval of change for the feature-value-table generating unit 212 changing the position and the orientation of the reference model stepwise is determined as appropriate according to the capacity of the feature value table, detection accuracy for a position and a orientation required of the position and orientation detecting device 21, and the like.

The feature-value-table storing unit 213 captures and stores the feature value table supplied from the feature-value-table generating unit 212. In other words, the feature-value-table storing unit 213 stores a feature value table that associates position data and orientation data of the reference model, which are obtained every time the position and the orientation of the reference model in the virtual space are changed stepwise, and a feature value of a two-dimensional reference model image (a reference model image feature value). The feature-value-table storing unit 213 is realized by, for example, a semiconductor storage device.

The photographed-image acquiring unit 214 captures the photographed image of the target object W supplied from the photographing device 30 and supplies the photographed image to the rough detection unit 215.

The rough detection unit 215 captures the photographed image supplied from the photographed-image acquiring unit 214 and calculates a feature value of the photographed image (a photographed image feature value). The rough detection unit 215 extracts, from the feature value table stored in the feature-value-table storing unit 213, a plurality of sets of position data and orientation data associated with a reference model image feature value substantially coinciding with (including "coinciding with"; the same applies in the following explanation) the photographed image feature value. The rough detection unit 215 reads the reference model stored in the reference-model storing unit 211 and sets the position and the orientation of the reference model according to the extracted position data and orientation data. The rough detection unit 215 causes the virtual camera to photograph the reference model and acquires reference model images (two-dimensional images) for the plurality of sets.

The rough detection unit 215 calculates a correlation between the photographed image and each of the two-dimensional images for the plurality of sets and supplies position data and orientation data corresponding to a two-dimensional image having the highest correlation to the detailed detection unit 216 as a rough detection result. As the calculation of the correlation, for example, a degree of difference between the photographed image and the reference model image is calculated and, when the degree of difference is the smallest, the correlation is regarded as the highest. Alternatively, a degree of similarity between the photographed image and the reference model image may be calculated and, when the degree of similarity is the largest, the correlation may be regarded as the highest. The rough detection unit 215 supplies the photographed image to the detailed detection unit 216.

The detailed detection unit 216 captures the position data and the orientation data, which are the rough detection result, and the photographed image supplied from the rough detection unit 215. The detailed detection unit 216 reads the reference model stored in the reference-model storing unit 211 and sets the position and the orientation of the reference model according to the captured position data and orientation data. The detailed detection unit 216 causes the virtual camera to photograph the reference model and acquires reference model images (two-dimensional images). The detailed detection unit 216 calculates a two-dimensional image having the highest correlation between the photographed image and each of the two dimensional images according to the nonlinear minimization method and supplies position data and orientation data (a detailed detection result) corresponding to the two-dimensional image to the driving control unit 22 as data indicating the position and the orientation of the target object W. The detailed detection unit 216 applies, for example, the steepest descent method or the Levenberg-Marquardt algorithm as the nonlinear minimization method.

Since the position and orientation detecting device 21 includes the detailed detection unit 216, the position and orientation detecting device 21 can more accurately detect the position and the orientation of the target object W.

The position and orientation detecting device 21 does not have to include the detailed detection unit 216. The position and orientation detecting device 21 may supply the rough detection result of the rough detection unit 215 to the driving control device 22 as the data indicating the position and the orientation of the target object W.

The position and orientation detecting device 21 may select one of the rough detection result and the detailed detection result according to detection accuracy required of the position and orientation detecting device 21 and supply the rough detection result or the detailed detection result to the driving control device 22 as the data indicating the position and the orientation of the target object W.

The driving control device 22 performs association of a coordinate system (a camera coordinate system) provided on the virtual space by the position and orientation detecting device 21 and a coordinate system (a robot coordinate system) applied to the robot main body 10. In other words, the driving control device 22 performs calibration processing for the camera coordinate system applied to the position and orientation detecting device 21 and the robot coordinate system applied to the robot main body 10.

The driving control device 22 captures the position data and the orientation data, which are the detection result of the target object W, supplied from the position and orientation detecting device 21 and calculates, on the basis of the position data and the orientation data, the positions and the orientations of the gripping unit 11 and the claw unit included in the robot main body 10. The driving control device 22 controls, on the basis of a result of the calculation, the actions of the movable units of the robot main body 10, i.e., the supporting table 10a, the arm unit 10b, the hand unit 10c, the gripping unit 11, and the claw unit.

Virtual Space

Figure 3:
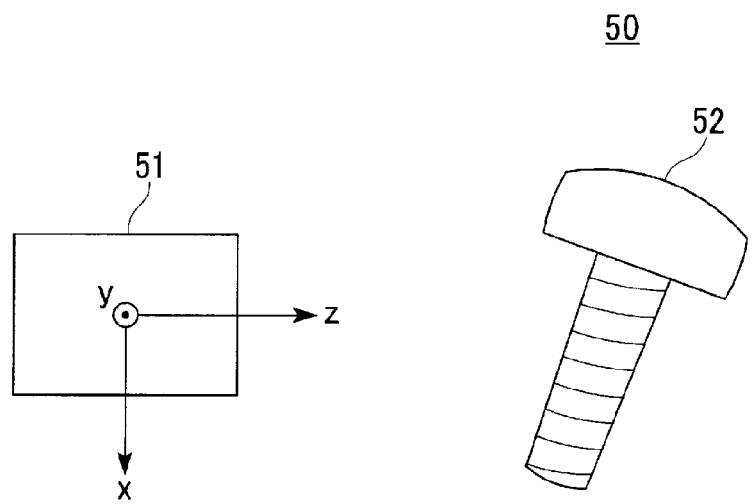
FIG. 3 is a diagram schematically showing a virtual camera and a reference model in a virtual space expanded on a memory space of a storing unit by a feature-value-table generating unit.

FIG. 3 is a diagram schematically showing the virtual camera and the reference model in the virtual space expanded on the memory space of the storing unit by the feature-value-table generating unit 212.

In the figure, a virtual camera 51 and a reference model 52 are included in a virtual space 50 expanded on the memory space by the feature-value-table generating unit 212. A camera coordinate system (a three-dimensional Cartesian coordinate system or an xyz Cartesian coordinate system) for showing a position and a orientation in the virtual space 50 is provided in the virtual space 50. In the figure, the origin of the camera coordinate is provided in the center position of a not-shown virtual image pickup surface of the virtual camera 51 and the optical axis of the virtual camera 51 is set coaxial with the z axis.

The position and the orientation of the reference model 52 in the figure are represented as, for example, $[x, y, z, \theta_x, \theta_y, \theta_z]^T$ by translation and rotation in the camera coordinate system.

Reference Model Image

Figure 4:
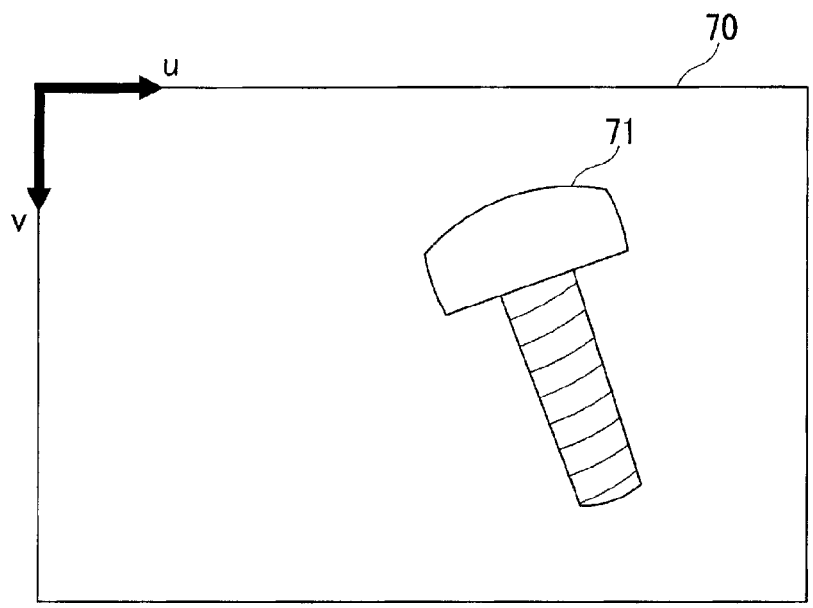
FIG. 4 is a diagram schematically showing a reference model image obtained by the virtual camera grasping the reference model as a subject and photographing the reference model in the virtual space shown in FIG. 3.

FIG. 4 is a diagram schematically showing a reference model image obtained by the virtual camera 51 taking a picture of the reference model 52 as a subject and photographing the reference model 52 in the virtual space 50 shown in FIG. 3.

In FIG. 4, a two-dimensional model image 71 of the reference model 52 obtained when the reference model 52 is taken from the virtual camera point of view 51 is included in a reference model image 70 acquired by the virtual camera 51. A two-dimensional Cartesian coordinate system (a uv Cartesian coordinate system) for showing the position of the two-dimensional model image 71 is provided in the reference model image 70. In the figure, the origin of the two-dimensional Cartesian coordinate system is provided in the position at the upper left end of the reference model image 70. The horizontal direction is set as the u axis and the vertical direction is set as the v axis.

The position of a pixel in the two-dimensional model image 71 in the figure is represented as $[u, v]^T$ by translation of each of the u axis and the v axis.

Calculation of a Feature Value by the Feature-Value-Table Generating Unit 212

A feature value calculated for each reference model image by the feature-value-table generating unit 212 of the position and orientation detecting device 21 is specifically explained. A feature value of a reference model image is key data for extracting position data and orientation data from the feature value table and is a feature value of a relatively low dimension.

Specifically, the feature-value-table generating unit 212 calculates, as a feature value of a reference model image, a coordinate value (a center of gravity coordinate value) indicating the center of gravity position of the reference model image. For example, the feature-value-table generating unit 212 calculates a center of gravity coordinate value $[u_i, v_i]^T$ of the reference model image according to Expression (1) below. In Expression (1), $I_i(u, v)$ represents a pixel value in the pixel position $[u, v]^T$ of the reference model image. The pixel value is, for example, a luminance value of a pixel and is represented by 8 bits (gradations in 256 stages).

$$u_i = \frac{\sum u \cdot I_i(u, v)}{\sum I_i(u, v)} \quad (1)$$

$$v_i = \frac{\sum v \cdot I_i(u, v)}{\sum I_i(u, v)}$$

Feature Value Table

A feature value table generated by the feature-value-table generating unit 212 is explained. A table below is a table showing a data configuration of the feature value table.

TABLE 1

| Feature value table | | | | | | | |
|---|---|---|---|---|---|---|---|
| Position data | | | Orientation data | | | Feature value | |
| x | y | z | $\theta_x$ | $\theta_y$ | $\theta_z$ | u | v |
| $x_1$ | $y_1$ | $z_1$ | $\theta_{x1}$ | $\theta_{y1}$ | $\theta_{z1}$ | $u_1$ | $v_1$ |
| $x_2$ | $y_2$ | $z_2$ | $\theta_{x2}$ | $\theta_{y2}$ | $\theta_{z2}$ | $u_2$ | $v_2$ |
| . | . | . | . | . | . | . | . |
| . | . | . | . | . | . | . | . |
| . | . | . | . | . | . | . | . |
| $x_n$ | $y_n$ | $z_n$ | $\theta_{xn}$ | $\theta_{yn}$ | $\theta_{zn}$ | $u_n$ | $v_n$ |

As shown in Table 1, the feature value table includes a record that associates, for each of a plurality of positions and a plurality of orientations of a reference model, position data indicating the position, orientation data indicating the orientation, and a feature value. The position data and the orientation data are, for example, data representing translation and rotation in the camera coordinate system at a predetermined reference point in the reference model 52 viewed from the virtual camera 51 shown in FIG. 3. The feature value is, for example, a center of gravity coordinate value indicating the position of the center of gravity of the reference model image 70 shown in FIG. 4.

Calculation of a Degree of Difference

A degree of difference between a photographed image and a reference model image calculated by the rough detection unit 215 of the position and orientation detecting device 21 is specifically explained.

The rough detection unit 215 calculates a degree of difference as displacement between center of gravity of the object in photographed image and that in feature-value-table.

The rough detection unit 215 obtains the degree of difference $R_j$ by calculating a square of a difference value between the reference model image $I_j(u, v)$ and the photographed image $T(u, v)$. The degree of difference $R_j$ is a value equal to or larger than 0 (zero). As the value is smaller, a degree of difference is smaller. As the degree of difference is smaller, a degree of similarity is larger. As the degree of difference is larger, the degree of similarity is smaller.

Operation of the Position and Orientation Detecting Device 21

The operation of the position and orientation detecting device 21 included in the robot control device 20 in the robot system 1 is explained.

Figure 5:
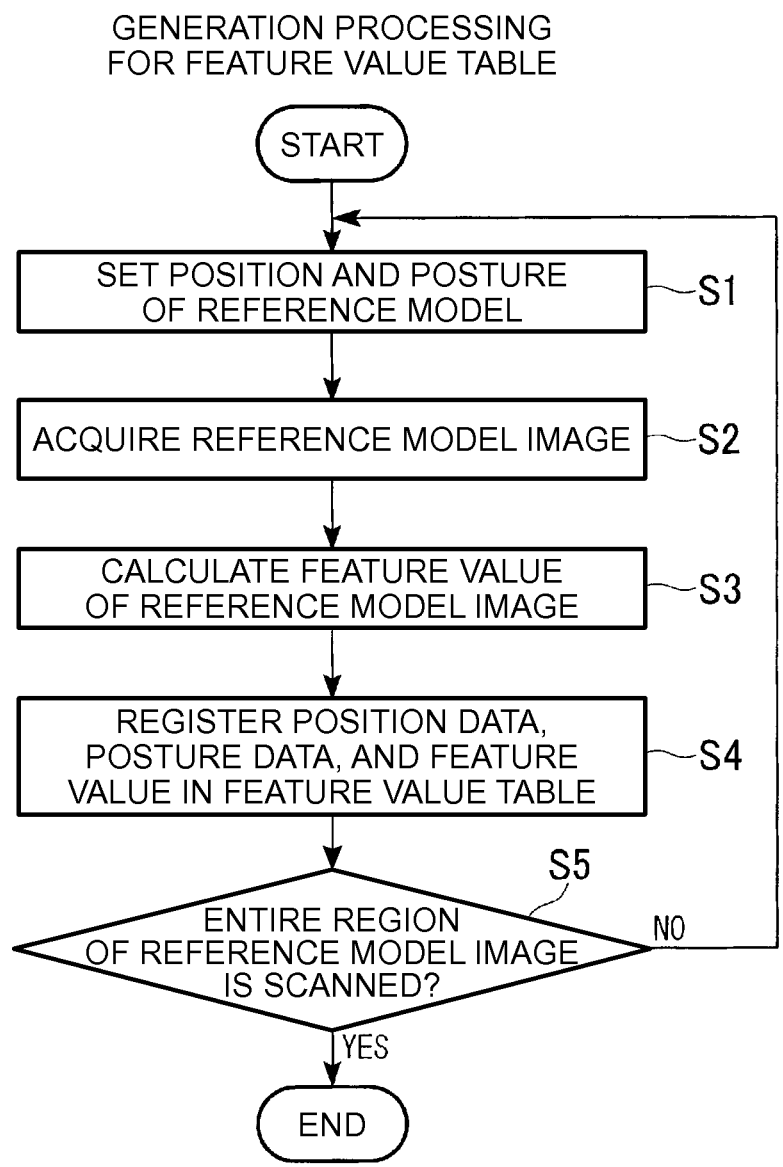
FIG. 5 is a flowchart for explaining a procedure of processing in which the feature-value-table generating unit of the position and orientation detecting device generates a feature value table in the embodiment.

FIG. 5 is a flowchart for explaining a procedure of processing in which the feature-value-table generating unit 212 of the position and orientation detecting device 21 generates a feature value table.

The feature-value-table generating unit 212 expands, on the memory space of the storing unit, a virtual space in which a reference model of the target object W and a virtual camera for photographing the reference model are present and executes the processing shown in the figure.

In step S1, the feature-value-table generating unit 212 sets the position and the orientation of the reference model in the virtual space. The feature-value-table generating unit 212 changes each of six variables including $[x_i, y_i, z_i, \theta_{xi}, \theta_{yi}, \theta_{zi}]^T$ stepwise at an arbitrary interval while repeating a loop of the flowchart in order to acquire reference model images of the reference model due to various positions and orientations in an angle of view taken by the virtual camera. In other words, the feature-value-table generating unit 212 scans the position and the orientation of the reference model while changing the position and the orientation of the reference model in an entire region of the reference model image.

Subsequently, in step S2, the feature-value-table generating unit 212 photographs the reference model with the virtual camera and acquires a reference model image.

In step S3, the feature-value-table generating unit 212 calculates a feature value of the reference model image (a reference model image feature value). For example, the feature-value-table generating unit 212 calculates a center of gravity coordinate value of the reference model image by applying Expression (1) and sets the center of gravity coordinate value as a feature value.

In step S4, the feature-value-table generating unit 212 registers position data and orientation data indicating the position and the orientation of the reference model at the time when the reference model image is acquired and the feature value in the feature value table in association with one another.

In step S5, the feature-value-table generating unit 212 determines whether the scanning of the position and the orientation of the reference model is completed in the entire region of the reference model image. When determining that the scanning is completed (YES in S5), the feature-value-table generating unit 212 ends the processing of the flowchart. When determining that the scanning is not completed (NO in S5), the feature-value-table generating unit 212 returns the processing to step S1.

Figure 6:
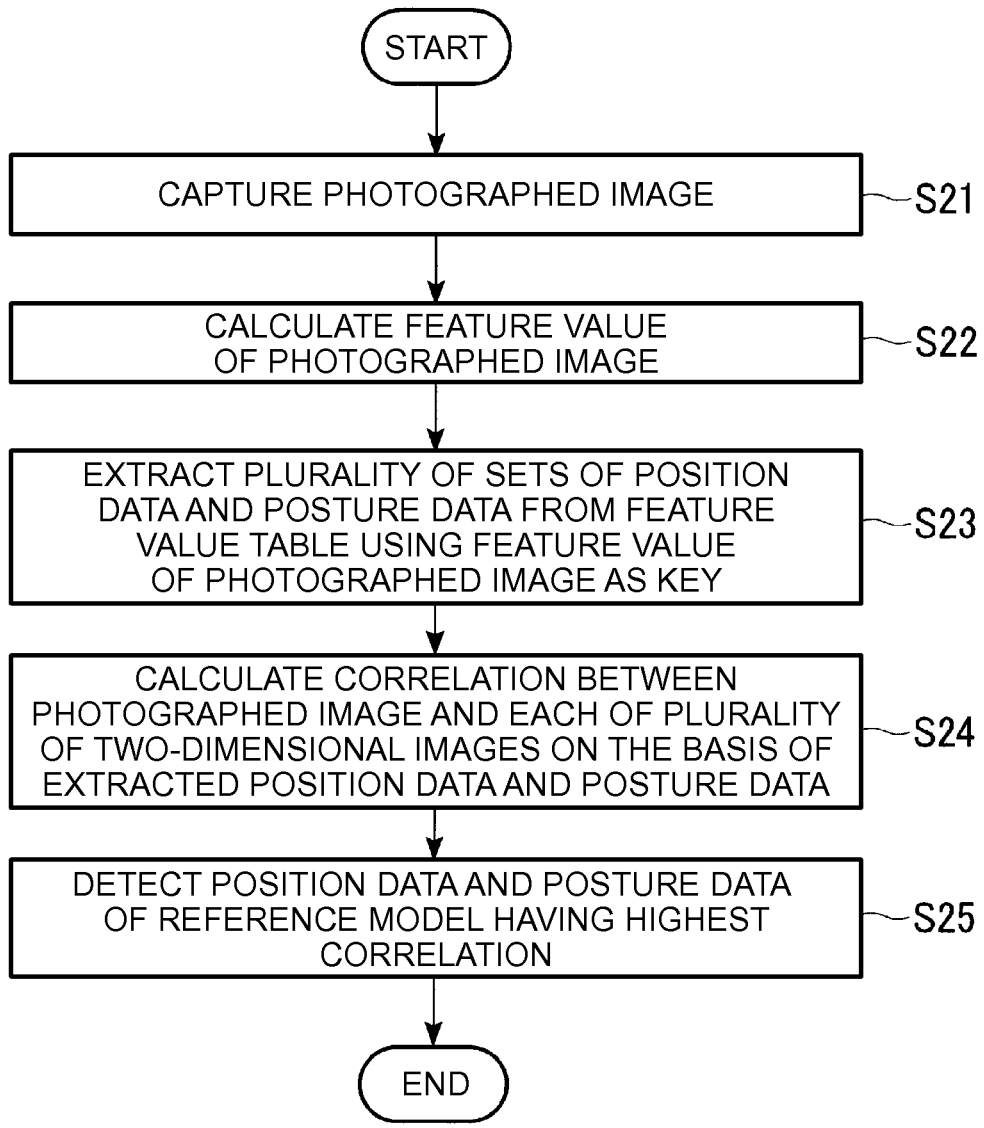
FIG. 6 is a flowchart showing a procedure of processing in which a rough detection unit of the position and orientation detecting device detects the position and the orientation of a target object (rough detection processing) in the embodiment.

FIG. 6 is a flowchart showing a procedure of processing in which the rough detection unit 215 of the position and orientation detecting device 21 detects the position and the orientation of a target object W (rough detection processing).

In step S21, the photographed-image acquiring unit 214 captures a photographed image of the target object W supplied from the photographing device 30 and supplies the photographed image to the rough detection unit 215. Subsequently, the rough detection unit 215 captures the photographed image supplied from the photographed-image acquiring unit 214.

Subsequently, in step S22, the rough detection unit 215 calculates a feature value of the photographed image (a photographed image feature value). For example, the rough detection unit 215 calculates a center of gravity coordinate value of the photographed image.

In step S23, the rough detection unit 215 extracts, from the feature value table stored in the feature-value-table storing unit 213, a plurality of sets of position data and orientation data associated with a feature value (a reference model image feature value) substantially coinciding with (including "coinciding with") the photographed image feature value.

In step S24, the rough detection unit 215 reads the reference model stored in the reference-model storing unit 211 and sets the position and the orientation of the reference model according to the extracted position data and orientation data. Subsequently, the rough detection unit 215 causes the virtual camera to photograph the reference model and acquires reference model images (two-dimensional images) for the plurality of sets. The rough detection unit 215 calculates a correlation between the photographed image and each of the two-dimensional images for the plurality of sets. For example, the rough detection unit 215 calculates a degree of difference between the photographed image and each of the two-dimensional images for the plurality of sets.

In step S25, the rough detection unit 215 supplies position data and orientation data corresponding to a two-dimensional image having the highest correlation to the detailed detection unit 216 as a rough detection result. For example, the rough detection unit 215 supplies position data and orientation data corresponding to a reference model image having the smallest degree of difference to the detailed detection unit 216 as a rough detection result. The rough detection unit 215 supplies the photographed image to the detailed detection unit 216.

Figure 7:
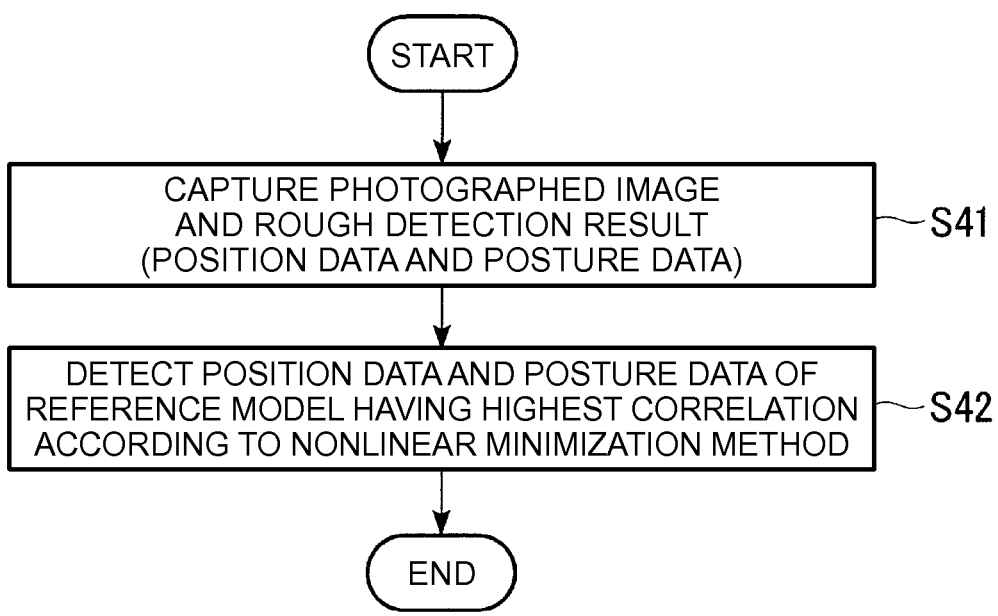
FIG. 7 is a flowchart for explaining a procedure of processing in which a detailed detection unit of the position and orientation detecting device detects the position and the orientation of the target object (detailed detection processing) in the embodiment.

FIG. 7 is a flowchart for explaining a procedure of processing in which the detailed detection unit 216 of the position and orientation detecting device 21 detects the position and the orientation of the target object W (detailed detection processing).

In step S41, the detailed detection unit 216 captures the photographed image and the position data and the orientation data, which are the rough detection result, supplied from the rough detection unit 215.

Subsequently, in step S42, the detailed detection unit 216 reads the reference model stored in the reference-model storing unit 211 and sets the position and the orientation of the reference model according to the captured position data and orientation data. Subsequently, the detailed detection unit 216 causes the virtual camera to photograph the reference model and acquires reference model images (two-dimensional images). The detailed detection unit 216 calculate a two-dimensional image having the highest correlation between the photographed image and each of the two-dimensional images according to the nonlinear minimization method and supplies position data and orientation data corresponding to the two-dimensional image to the driving control unit 22 as a detection result.

The detailed detection unit 216 calculates position and orientation by minimizing a degree of difference $R_j$ between a photographed image T (u, v) and a reference model image $I_j$(u, v) according to Expression (2) below as a function of position and orientation of the object model in virtual space.

$$R_j = \Sigma |I_j(u,v) - T(u,v)|^2 \quad (2)$$

Second Embodiment

In a robot system according to a second embodiment of the invention, a gripping unit attached to a robot main body grips or holds a component in advance. The robot system acquires a photographed image of a main body assembly to which the component is attached, controls the position and the orientation of the gripping unit on the basis of the photographed image, and moves the gripping unit to the main body assembly.

Figure 8:
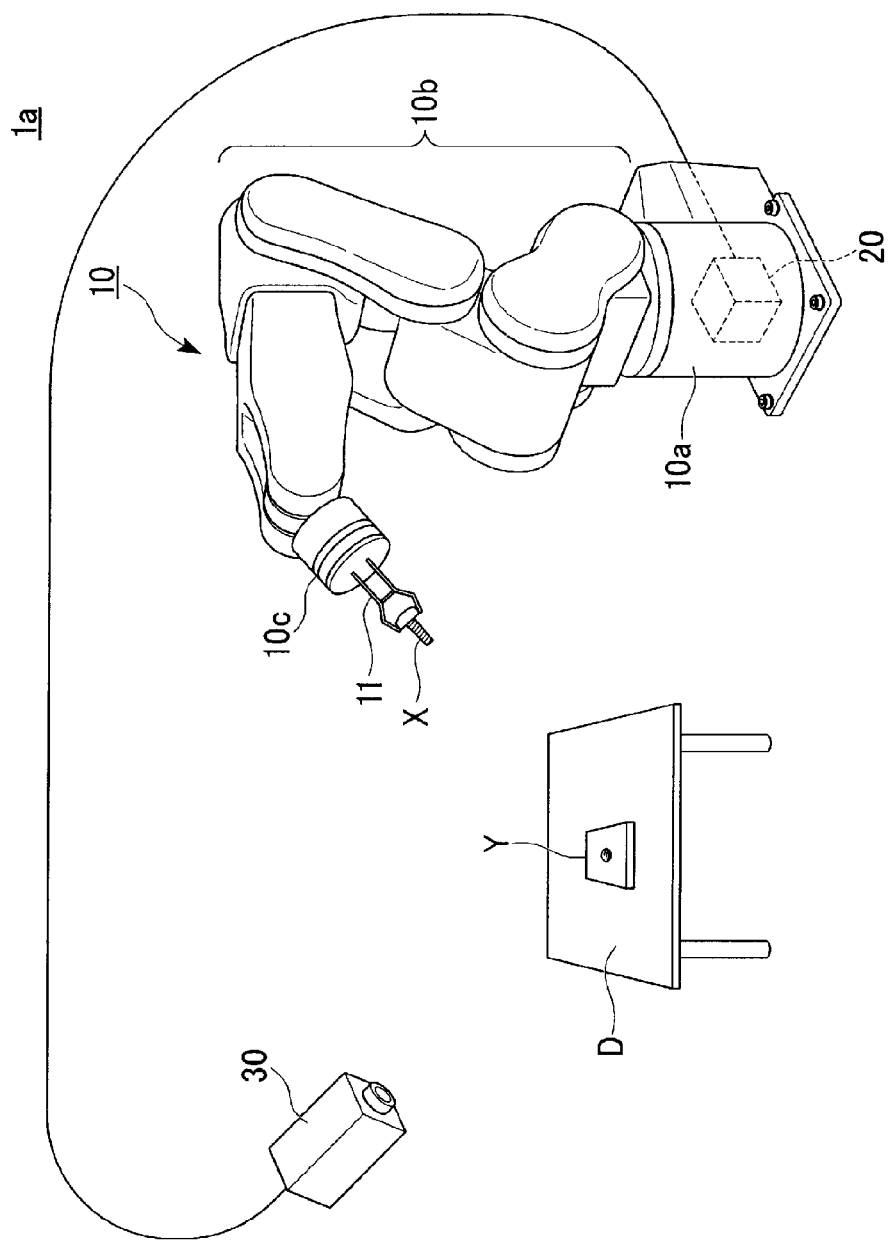
FIG. 8 is a schematic external view showing a state in which a robot system, to which a robot apparatus and a position and orientation detecting device according to a second embodiment of the invention are applied, performs work.

FIG. 8 a schematic external view showing a state in which a robot system, to which a robot apparatus and a position and orientation detecting device according to the second embodiment are applied, performs work.

In the figure, a robot system 1a includes the robot main body 10, the gripping unit 11, the robot control device 20 housed on the inside of the robot main body 10, and the photographing device 30.

The components of the robot system 1a is the same as the components in the first embodiment. Therefore, in this embodiment, explanation of the components common to the first embodiment is omitted concerning the robot main body 10, the gripping unit 11, the robot control device 20, and the photographing device 30.

As shown in FIG. 8, the robot main body 10 movably includes the gripping unit 11. The desk D on which a main body assembly Y is placed is set in a movable range of the gripping unit 11 moved by the action of the robot main body 10. The main body assembly Y is an object to which a component X gripped or held by the gripping unit 11 is attached. In this embodiment, the component X is a "screw" and the main body assembly Y is a "member having a screw hole".

The photographing device 30 is set in a position and a direction in which the photographing device 30 can photograph the main body assembly Y. The photographing device 30 photographs the main body assembly Y to acquire a photographed image and supplies the photographed image to the robot control device 20.

The robot control device 20 captures the photographed image of the main body assembly Y supplied from the photographing device 30 and detects the position and the orientation of the main body assembly Y on the basis of the photographed image. The robot control device 20 controls the actions of the movable units of the robot main body 10 on the basis of the detected position and orientation to move the gripping unit 11 toward the main body assembly Y. Consequently, the robot main body 10 can perform work for attaching the component X to the main body assembly Y.

In FIG. 8, the robot control device 20 is housed in the supporting table 10a of the robot main body 10. The robot control device 20 may be set to be separated from the robot main body 10. In this case, the robot control device 20 and the robot main body 10 are connected via, for example, a communication line (a network, a serial communication line, etc.).

Third Embodiment

In a robot system according to a third embodiment of the invention, a robot main body includes hands of two systems. The robot system acquires a photographed image of a target object with a photographing device attached to one hand of the robot main body and controls, on the basis of the photographed image, the position and the orientation of a gripping unit attached to the other hand to move the gripping unit toward the target object.

Figure 9:
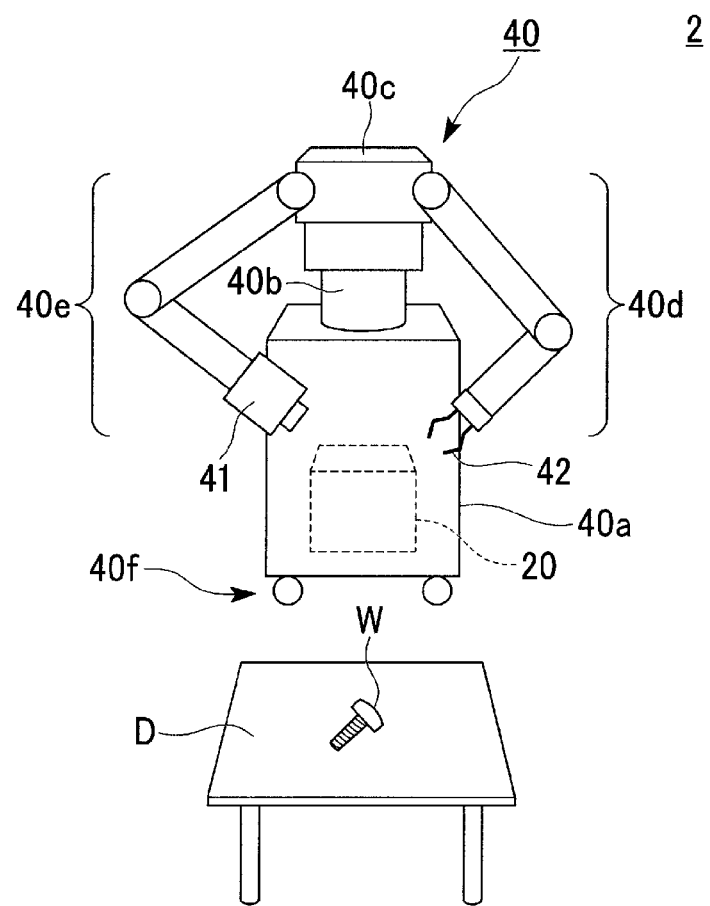
FIG. 9 is a schematic external view showing a state in which a robot system, to which a robot apparatus and a position and orientation detecting device according to a third embodiment of the invention are applied, performs work.

FIG. 9 is a schematic external view showing a state in which a robot system, to which a robot apparatus and a position and orientation detecting device according to the third embodiment are applied, performs work.

In the figure, a robot system (a robot apparatus) 2 includes a robot main body 40, a photographing device 41, a gripping unit 42, and the robot control device 20 housed on the inside of the robot main body 40.

The configuration of the robot control device 20 is the same as the configuration in the first embodiment. Therefore, detailed explanation concerning the robot control device 20 is omitted.

The robot main body 40 specifically includes, a main body 40a movably set with respect to the ground, a neck unit 40b coupled to the main body 40a to be capable of turning, a head unit 40c fixed to the neck unit 40b, a first arm unit 40d coupled to the head unit 40c to be capable of turning and capable of bending, a second arm unit 40e coupled to the head unit 40c to be capable of turning and capable of bending, and a conveying unit 40f attached to the main body 40a to be capable of moving the robot main body 40 with respect to a setting surface of the robot main body 40.

The gripping unit 42 is attached to a hand, which is an open end of the first arm unit 40d. The photographing device 41 is attached to a hand, which is an open end of the second arm unit 40e.

The conveying unit 40f supports the robot main body 40 to be capable of moving in a fixed direction or any direction with respect to the setting surface of the robot main body 40. The conveying unit 40f is realized by a set of four wheels, a set of four casters, a pair of caterpillars, or the like.

The robot main body 40 is, for example, a vertical multi-joint robot (a double arm robot) including hands of two systems. The robot main body 40 realizes coordinated actions of the main body 40a, the neck unit 40b, the head unit 40c, the first arm unit 40d, and the second arm unit 40e according to driving control by the robot control device 20. The robot main body 40 moves the photographing device 41 and the gripping unit 42 in a free space independently from each other to open and close a claw unit of the gripping unit 42.

The photographing device 41 photographs a subject to acquire a photographed image, which is a still image or a moving image, and supplies the photographed image to the robot control device 20. The photographing device 41 is realized by, for example, a digital camera device or a digital video camera device.

The gripping unit 42 includes the claw unit that can grip or hold an object. In FIG. 9, the gripping unit 42 is schematically shown to show a function thereof.

As shown in FIG. 9, the desk D on which the target object W is placed is set in a movable range of the gripping unit 42 moved by the action of the robot main body 40. The target object W is an object to be gripped or held by the gripping unit 42. In this embodiment, the target object W is a "screw".

The robot control device 20 controls the actions of the neck unit 40b, the head unit 40c, and the second arm unit 40e of the robot main body 40 to change the position and the orientation of the photographing device 41. The robot control device 20 captures a photographed image of the target object W supplied from the photographing device 41 and detects the position and the orientation of the target object W on the basis of the photographed image. The robot control device 20 controls the actions of the neck unit 40b, the head unit 40c, and the first arm unit 40d of the robot main body 40 on the basis of the detected position and orientation to move the gripping unit 42 toward the target object W.

In FIG. 9, the robot control device 20 is housed in the main body 40a of the robot main body 40. The robot control device 20 may be set to be separated from the robot main body 40. In this case, the robot control device 20 and the robot main body 40 are connected via, for example, a communication line (a network, a serial communication line, etc.).

Fourth Embodiment

In a robot system according to a fourth embodiment of the invention, a gripping unit attached to one hand of a robot main body including hands of two systems grips or holds a component in advance. The robot system acquires, with a photographing device attached to the other hand of the robot main body, a photographed image of a main body assembly to which the component is attached and controls the position and the orientation of the gripping unit on the basis of the photographed image to move the gripping unit toward the main body assembly.

Figure 10:
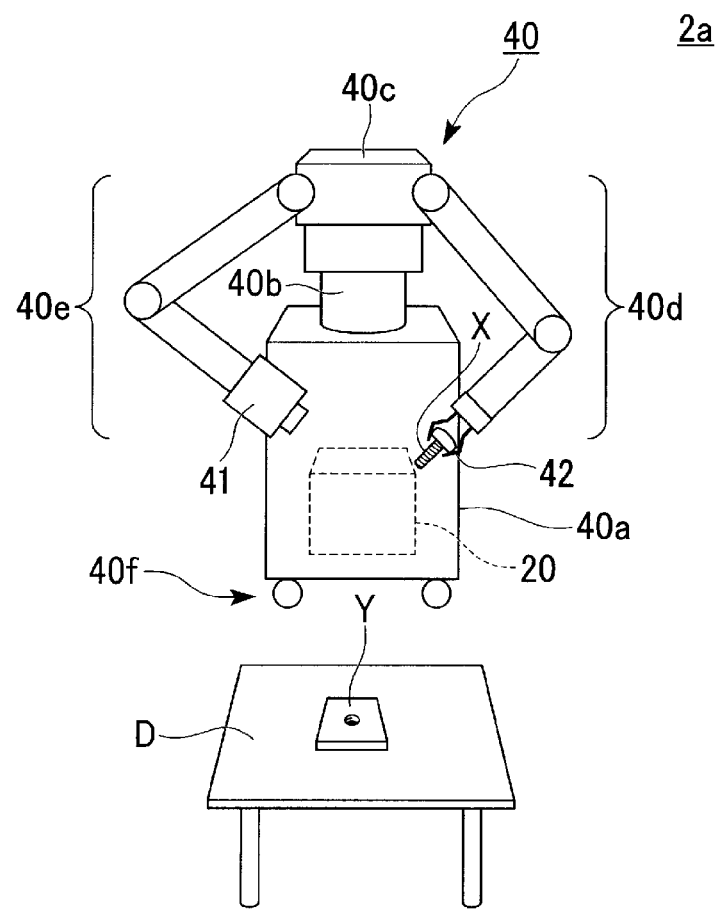
FIG. 10 is a schematic external view showing a state in which a robot system, to which a robot apparatus and a position and orientation detecting device according to a fourth embodiment of the invention are applied, performs work.

FIG. 10 is a schematic external view showing a state in which a robot system, to which a robot apparatus and a position and orientation detecting device according to the fourth embodiment are applied, performs work.

In the figure, a robot system (a robot apparatus) 2a includes the robot main body 40, the photographing device 41, the gripping unit 42, and the robot control device 20 housed on the inside of the robot main body 40.

The components of the robot system 2a are the same as the components in the third embodiment. Therefore, in this embodiment, explanation of the components common to the third embodiment is omitted concerning the robot main body 40, the photographing device 41, the gripping unit 42, and the robot control device 20.

As shown in FIG. 10, the desk D on which the main body assembly Y is placed is set in the movable range of the gripping unit 42 moved by the action of the robot main body 40. The main body assembly Y is an object to which the component X gripped or held by the gripping unit 42 is attached. In this embodiment, the component X is a "screw" and the main body assembly Y is a "member having a screw hole".

The robot control device 20 controls the actions of the neck unit 40b, the head unit 40c, and the second arm unit 40e of the robot main body 40 to change the position and the orientation of the photographing device 41. The robot control device 20 captures the photographed image of the main body assembly Y supplied from the photographing device 41 and detects the position and the orientation of the main body assembly Y on the basis of the photographed image. The robot control device 20 controls the actions of the neck unit 40b, the head unit 40c, and the first arm unit 40d of the robot main body 40 on the basis of the detected position and orientation to move the gripping unit 42 toward the main body assembly Y. Consequently, the robot main body 40 can perform work for attaching the component X to the main body assembly Y.

In FIG. 10, the robot control device 20 is housed in the main body 40a of the robot main body 40. The robot control device 20 may be set to be separated from the robot main body 40. In this case, the robot control device 20 and the robot main body 40 are connected via, for example, a communication line (a network, a serial communication line, etc.).

Fifth Embodiment

In a robot system according to a fifth embodiment of the invention, one gripping unit attached to one hand of a robot main body including hands of two systems grips or holds a component. The other gripping unit attached to the other hand grips or holds a main body assembly. A photographing device is included in the robot system. The robot system causes the photographing device to photograph the main body assembly gripped or held by the other gripping unit of the robot main body and acquires a photographed image. The robot system controls the position and the orientation of the one gripping unit on the basis of the photographed image to move the one gripping unit toward the main body assembly.

Figure 11:
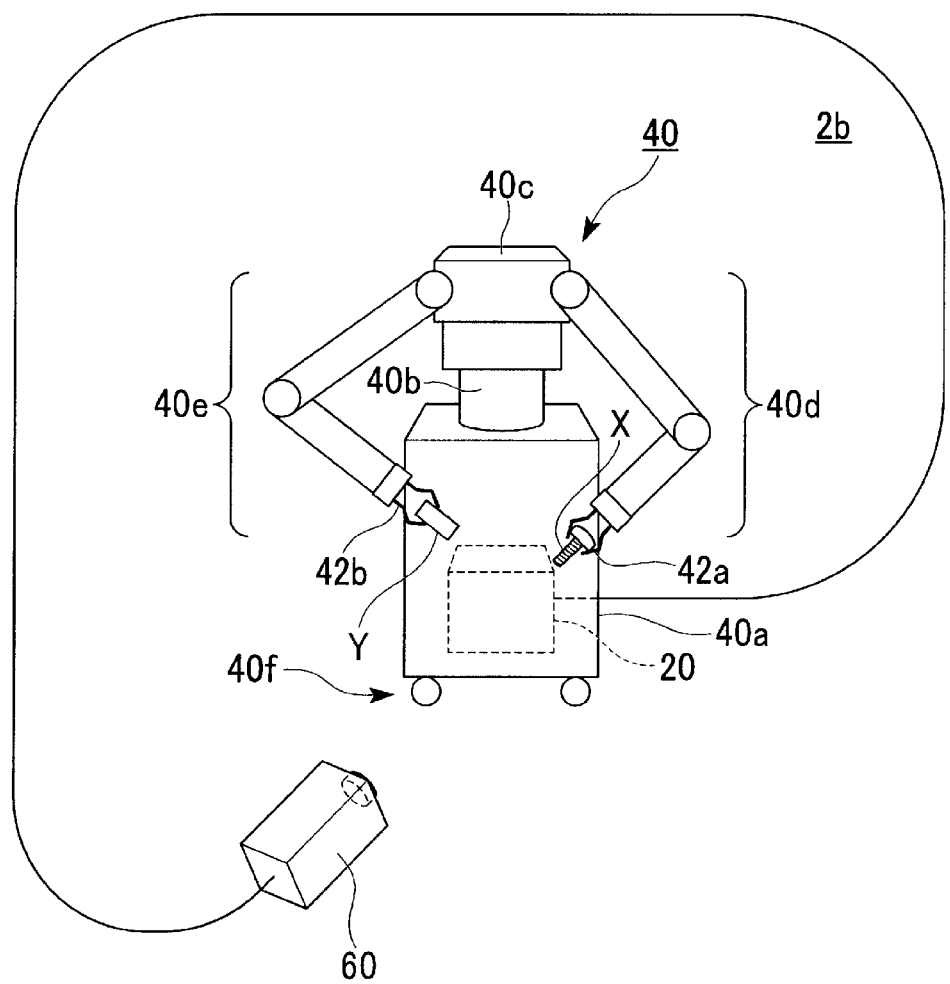
FIG. 11 is a schematic external view showing a state in which a robot system, to which a robot apparatus and a position and orientation detecting device according to a fifth embodiment of the invention are applied, performs work.

FIG. 11 is a schematic external view showing a state in which a robot system, to which a robot apparatus and a position and orientation detecting device according to the fifth embodiment are applied, performs work.

In the figure, a robot system 2b includes a photographing device 60, the robot main body 40, a first gripping unit 42a, a second gripping unit 42b, and the robot control device 20 housed on the inside of the robot main body 40. The robot main body 40 and the robot control device 20 are included in a robot apparatus.

Explanation of the components common to the third embodiment is omitted concerning the robot main body 40 and the robot control device 20.

The first gripping unit 42a is attached to a hand, which is an open end of the first arm unit 40d. The first gripping unit 42a grips or holds the component X. The second gripping unit 42b is attached to a hand, which is an open end of the second arm unit 40e. The second gripping unit 42b grips or holds the main body assembly Y. The main body assembly Y is an object to which the component X is attached. In this embodiment, the component X is a "screw" and the main body assembly Y is a "member having a screw hole".

The first griping unit 42a and the second gripping unit 42b respectively include claw units that can grip or hold an object. In FIG. 11, the first gripping unit 42a and the second gripping unit 42b are schematically shown to show functions thereof.

The robot main body 40 realizes coordinated actions of the main body 40a, the neck unit 40b, the head unit 40c, the first arm unit 40d, and the second arm unit 40e according to driving control by the robot control device 20. The robot main body 40 moves the first gripping unit 42a and the second gripping unit 42b in a free space independently from each other to open and close the claw units of the first gripping unit 42a and the second gripping unit 42b.

The photographing device 60 photographs a subject to acquire a photographed image, which is a still image or a moving image, and supplies the photographed image to the robot control device 20. The photographing device 60 is realized by, for example, a digital camera device or a digital video camera device.

The robot control device 20 controls the actions of the neck unit 40b, the head unit 40c, and the second arm unit 40e of the robot main body 40 to change the position and the orientation of the main body assembly Y. The robot control device 20 captures a photographed image of the main body assembly Y supplied from the photographing device 60 and detects the position and the orientation of the main body assembly Y on the basis of the photographed image. The robot control device 20 controls the actions of the neck unit 40b, the head unit 40c, and the first arm unit 40d of the robot main body 40 on the basis of the detected position and orientation to move the left gripping unit 42a toward the main body assembly Y. Consequently, the robot main body 40 can perform work for attaching the component X to the main body assembly Y.

In FIG. 11, the robot control device 20 is housed in the main body 40a of the robot main body 40. The robot control device 20 may be set to be separated from the robot main body 40. In this case, the robot control device 20 and the robot main body 40 are connected via, for example, a communication line (a network, a serial communication line, etc.).

As explained above concerning the first to fifth embodiments of the invention, when set in the learning mode, the position and orientation detecting device 21 applies a reference model, which is three-dimensional model data of a target object or a reference, and calculates reference model image feature values of two-dimensional reference model images due to various positions and orientations of the reference model. The position and orientation detecting device 21 stores the reference model image feature values as a feature value table that associates position data and orientation data. In this way, the position and orientation detecting device 21 generates and retains the feature value table corresponding to the target objet in advance.

When set in the measurement mode, the position and orientation detecting device 21 acquires a photographed image of a target object from the photographing device 30 and calculates a photographed image feature value from the photographed image. The position and orientation detecting device 21 extracts, from the feature value table, a plurality of sets of position data and orientation data associated with a reference model image feature value substantially coinciding with the photographed image feature value. The position and orientation detecting device 21 sets the position and the orientation of the reference model according to the extracted position data and orientation data and acquires two-dimensional images for the plurality of sets. The position and orientation detecting device 21 calculates a correlation between the photographed image and each of the two-dimensional images for the plurality of sets and obtains position data and orientation data corresponding to a two-dimensional data having the highest correlation as a rough detection result. In this way, the position and orientation detecting device 21 performs rough detection of the position and the orientation of the target object.

When set in the measurement mode, the position and orientation detecting device 21 acquires two-dimensional images in which the position and the orientation of the reference model are set according to the position data and the orientation data, which are the rough detection result. The position and orientation detecting device 21 calculates a correlation between the photographed image and each of the two-dimensional image according to, for example, the non-linear minimization method, calculates a two-dimensional image having the highest correlation, and obtains position data and orientation data corresponding to the two-dimensional image as a detailed detection result. In this way, the position and orientation detecting device 21 performs detailed detection of the position and the orientation of the target object.

Since the position and orientation detecting device 21 is configured as explained above, with the position and orientation detecting device 21, feature values associated with various positions and orientations of the target object are stored in advance. Therefore, it is possible to calculate, without executing heavy-load calculation processing in which six variables including $[x, y, z, \theta_x, \theta_y, \theta_z]^T$ are used, the position and the orientation of the target object by calculating a feature value from a photographed image of the target object.

Therefore, with the position and orientation detecting device 21, it is possible to execute estimation processing for the position and the orientation of the target object with a light load and in a shorter time. The driving control device 22 can move a movable distal end portion of the robot main body 10 in the direction of the target object according to the position and the orientation of the target object detected by the position and orientation detecting device 21 and match the orientation of the movable distal end portion to the orientation of the target object.

The feature-value-table generating unit 212 calculates a center of gravity coordinate value of a reference model image as a feature value of the reference model image and sets the center of gravity coordinate value as a feature value of the reference model image. Besides, for example, the feature-value-table generating unit 212 may calculate an image moment of the reference model image and set the image moment as a feature value of the reference model image. When the image moment is used as the feature value of the reference model image, the feature-value-table generating unit 212 determines the order of the image moment according to the shape of a reference model.

Processing in which the feature-value-table generating unit 212 calculates an image moment of a reference model image is specifically explained below.

An image moment $m_{p,q}$ is obtained by calculating Expression (3) below. In Expression (3), f(u, v) is a pixel value at a coordinate value (u, v) of the reference model image. The pixel value is, for example, a luminance value of a pixel.

$$m_{p,q} = \sum_u \sum_v u^p \cdot v^p \cdot f(u, v) \tag{3}$$

EXAMPLE 1

A Reference Model is a Three-Dimensional Model not Having a Longitudinal Direction First, the feature-value-table generating unit 212 binarizes a reference model image. For example, the feature-value-table generating unit 212 generates a binary image in which a reference model portion in the reference model image is set to "1" and a portion (a background portion) excluding the reference model is set to "0 (zero)".

Subsequently, the feature-value-table generating unit 212 applies each of orders (p, q)=(0, 0), (1, 0), and (0, 1) to Expression (3) to acquire an image moment for each of the orders according to Expression (4) below concerning the binary image.

$$m_{0,0} = \sum_u \sum_v f(u, v) \tag{4}$$
$$m_{1,0} = \sum_u \sum_v u \cdot f(u, v)$$
$$m_{0,1} = \sum_u \sum_v v \cdot f(u, v)$$

As indicated by Expression (5) below, the feature-value-table generating unit 212 calculates a center of gravity ($u_G$, $v_G$) by dividing image moments in the orders of (p, q)=(1, 0) and (0, 1) by an image moment in the order of (p, q)=(0, 0).

$$(u_G, v_G) = \left( \frac{m_{1,0}}{m_{0,0}}, \frac{m_{0,1}}{m_{0,0}} \right) \tag{5}$$

The feature-value-table generating unit 212 sets the center of gravity ($u_G$, $v_G$) as a feature value obtained when the reference model is a three dimensional model not having a longitudinal direction.

EXAMPLE 2

A Reference Model is a Three-Dimensional Model Having a Longitudinal Direction

In the case of this example, as in the example 1 explained above, the feature-value-table generating unit 212 calculates the center of gravity ($u_G$, $v_G$). The feature-value-table generating unit 212 applies each of orders (p, q)=(1, 1), (2, 0), and (0, 2) to a center moment of a reference model image represented by Expression (6) below to acquire an image moment (a secondary moment) according to Expression (7) below concerning a binary image same as the binary image in Example 1. In Expression (7), f(u, v) is a pixel value at a coordinate value (u, v) of the reference model image. Θ is an angle formed by a major axis direction of a two-dimensional reference model and the u axis.

$$\mu_{p,q} = \sum_p \sum_q (u - u_G)^p \cdot (v - v_G)^p \cdot f(u, v) \qquad (6)$$

$$\tan(2\Theta) = \frac{\mu_{1,1}}{\mu_{2,0}\mu_{0,2}} \qquad (7)$$

The feature-value-table generating unit 212 sets the center of gravity ($u_G$, $V_G$) and $\tan(2\eta)$, which is a secondary image moment, as feature values obtained when the reference model is a three-dimensional model having a longitudinal direction.

As explained above, it is possible to obtain an accurate feature value according to the shape of a reference model by setting an image moment as a feature value of a reference model image.

A part of the functions of the position and orientation detecting device 21 may be realized by a computer. In this case, a position and orientation detecting program for realizing the functions maybe recorded in a computer-readable recording medium. The functions may be realized by causing a computer system to read the position and orientation detecting program recorded in the recording medium and execute the position and orientation detecting program. The computer system includes an operating system (OS) and hardware of peripheral devices. The computer-readable recording medium refers to a portable recording medium such as a flexible disk, a magneto-optical disk, an optical disk, or a memory card or a storage device such as a magnetic hard disk or a solid-state drive included in the computer system. Further, the computer-readable recording medium may include a recording medium that dynamically retains a computer program for a short time like a communication line in transmitting the computer program via a computer network such as the Internet, a telephone line, or a cellular phone network and may include a recording medium that retains the computer program for a fixed time like a volatile memory on the inside of the computer system functioning as a server apparatus or a client in transmitting the computer program. The position and orientation detecting program may be a computer program for realizing a part of the functions and may be a computer program for realizing the functions according to a combination with a computer program already recorded in the computer system.

The embodiments are explained in detail above with reference to the drawings. However, a specific configuration is not limited to the embodiments. The specific configuration includes a design and the like that do not depart from the spirit of the invention.

The entire disclosure of Japanese Patent Application No. 2012-008103 filed Jan. 18, 2012 is expressly incorporated by reference herein.

What is claimed is:

1. A control device comprising:
    a storing unit storing multiple first feature values for multiple images of a reference model, wherein the reference model is a three-dimensional model of an object and each of the first feature values includes a position and an orientation of the object for each of the images, and the position and the orientation of the reference model is different in each of the images;
    an image acquiring unit acquiring a photographed image of the object;
    a detecting unit calculating a second feature value for the photographed image, wherein the detecting unit selects a candidate image from the images of the reference model by comparing the second feature value with the first feature values;
    a driving control unit controlling a motion of a robot main body based on the position and the orientation of the reference model associated with the candidate image; and
    a detailed detection unit, wherein
    the detecting unit extracts a plurality of sets of position data and orientation data associated with the second feature value from the storing unit,
    the detecting unit sets, according to the plurality of sets of position data and orientation data, a given position and a given orientation in the three-dimensional space of the reference model, and acquires a first set of two-dimensional images for the plurality of sets of position data and orientation data,
    the detecting unit detects a first position data and a first orientation data corresponding to a first subject image, the first subject image is among the first set of two-dimensional images and has a highest correlation with the photographed image from among the first set of two-dimensional images,
    the detailed detection unit captures the first position data and the first orientation data of the first subject image detected by the detecting unit,
    the detailed detection unit sets, according to the first position data and the first orientation data, a position and an orientation in the three-dimensional space of the reference model and acquires a second set of two-dimensional images,
    the detailed detection unit calculates a second subject image, the second subject image is among the second set of two-dimensional images and has a highest correlation with the photographed image from among the second set of two-dimensional images, the second subject image is calculated according to a nonlinear minimization method,
    the detailed detection unit detects a second position data and a second orientation data corresponding to the second subject image, and
    the driving control unit controls the robot main body on the basis of the second position data and the second orientation data of the second subject image detected by the detailed detection unit to change the position and the orientation of a hand of the robot main body.

2. The control device according to claim 1, wherein the nonlinear minimization method is a steepest descent method.

3. The control device according to claim 1, further comprising a detailed detection unit, wherein the nonlinear minimization method is a Levenberg-Marquardt algorithm.

4. The control device according to claim 1, wherein the reference model is three-dimensional computer graphics.

5. The control device according to claim 1, wherein
    feature value is a coordinate value indicating a center of gravity position of the image of the reference model, and
    the second feature value is a coordinate value indicating a center of gravity position of the photographed image.

6. The control device according to claim 1, wherein
    the first feature value is an image moment of the image of the reference model, and
    the second feature value is an image moment of the photographed image.

7. A robot apparatus comprising:
    a robot main body movably including hands of two systems;

a conveying unit configured to support the robot main body to be capable of moving;

an imaging unit attached to one hand of the hands of the two systems and configured to photograph an object to generate a photographed image;

a storing unit storing multiple first feature values for multiple images of a reference model, wherein the reference model is a three-dimensional model of an object and each of the first feature values includes a position and an orientation of the object for each of the images, and the position and the orientation of the reference model is different in each of the images;

an image acquiring unit acquiring the photographed image of the object from the imaging unit;

a detecting unit calculating a second feature value for the photographed image, wherein the detecting unit selects a candidate image from the images of the reference model by comparing the second feature value with the first feature values;

a driving control unit controlling the robot main body based on the position and the orientation of the reference model associated with the candidate image to change a position and an orientation of the other hand of the hands of the two systems; and a detailed detection unit, wherein the detecting unit extracts a plurality of sets of position data and orientation data associated with the second feature value from the storing unit, the detecting unit sets, according to the plurality of sets of position data and orientation data, a given position and a given orientation in the three-dimensional space of the reference model, and acquires a first set of two-dimensional images for the plurality of sets of position data and orientation data, the detecting unit detects a first position data and a first orientation data corresponding to a first subject image, the first subject image is among the first set of two-dimensional images and has a highest correlation with the photographed image from among the first set of two-dimensional images, the detailed detection unit captures the first position data and the first orientation data of the first subject image detected by the detecting unit, the detailed detection unit sets, according to the first position data and the first orientation data, a position and an orientation in the three-dimensional space of the reference model and acquires a second set of two-dimensional images, the detailed detection unit calculates a second subject image, the second subject image is among the second set of two-dimensional images and has a highest correlation with the photographed image from among the second set of two-dimensional images, the second subject image is calculated according to a nonlinear minimization method, the detailed detection unit detects a second position data and a second orientation data corresponding to the second subject image, and the driving control unit controls the robot main body on the basis of the second position data and the second orientation data of the second subject image detected by the detailed detection unit to change the position and the orientation of the hands.

8. A position and orientation detecting method comprising:
acquiring a photographed image of an object;
calculating an image feature value for the photographed image;
comparing the image feature value of the photographed image with multiple reference feature values, wherein the multiple reference feature values are pre-stored for multiple images of a reference model, the reference model is a three-dimensional model of the object, and each of the reference feature values includes a position and an orientation of the object for each of the images, and the position and the orientation of the reference model is different in each of the images;

selecting a candidate image from among the multiple images of the reference model as result of comparing the image feature value with the multiple reference feature values;

extracting a plurality of sets of position data and orientation data associated with the image feature value;

setting, according to the plurality of sets of position data and orientation data, a given position and a given orientation in the three-dimensional space of the reference model;

acquiring a first set of two-dimensional images for the plurality of sets of position data and orientation data;

detecting a first position data and a first orientation data corresponding to a first subject image, wherein the first subject image is among the first set of two-dimensional images and has a highest correlation with the photographed image from among the first set of two-dimensional images;

capturing the first position data and the first orientation data of the first subject image detected;

setting, according to the first position data and the first orientation data, a position and an orientation in the three-dimensional space of the reference model;

acquiring a second set of two-dimensional images;

calculating a second subject image, wherein the second subject image is among the second set of two-dimensional images and has a highest correlation with the photographed image from among the second set of two-dimensional images, the second subject image is calculated according to a nonlinear minimization method;

detecting a second position data and a second orientation data corresponding to the second subject image; and controlling a robot main body on the basis of the second position data and the second orientation data of the second subject image.

9. A robot apparatus comprising:
a robot main body; and
the control device of claim 1, wherein the control device controls the robot main body.

10. A robot apparatus comprising:
a robot main body; and
the control device of claim 2, wherein the control device controls the robot main body.

11. A robot apparatus comprising:
a robot main body; and
the control device of claim 3, wherein the control device controls the robot main body.

12. A robot apparatus comprising:
a robot main body; and
the control device of claim 4, wherein the control device controls the robot main body.

13. A robot apparatus comprising:
a robot main body; and
the control device of claim 5, wherein the control device controls the robot main body.

14. A robot apparatus comprising:
a robot main body; and
the control device of claim 6, wherein the control device controls the robot main body.

* * * * *